United States Patent
Rothschild et al.

(10) Patent No.: US 9,462,312 B2
(45) Date of Patent: Oct. 4, 2016

(54) SYSTEMS AND METHODS FOR FACILITATING PURCHASES OF BROADBAND CONTENT AND SERVICES

(75) Inventors: Keith Alan Rothschild, Dunwoody, GA (US); Julius Bert Bagley, Lawrenceville, GA (US)

(73) Assignee: Cox Communications, Inc., Atlanta, GA (US)

(*) Notice: Subject to any disclaimer, the term of this patent is extended or adjusted under 35 U.S.C. 154(b) by 473 days.

(21) Appl. No.: 12/856,059

(22) Filed: Aug. 13, 2010

(65) Prior Publication Data
US 2012/0041830 A1 Feb. 16, 2012

(51) Int. Cl.
G06Q 30/00 (2012.01)
H04N 21/2543 (2011.01)
G06F 21/10 (2013.01)
G06Q 30/06 (2012.01)
H04L 29/06 (2006.01)

(52) U.S. Cl.
CPC .......... *H04N 21/2543* (2013.01); *G06F 21/10* (2013.01); *G06Q 30/06* (2013.01); *H04L 63/102* (2013.01); *G06F 2221/2135* (2013.01); *G06F 2221/2141* (2013.01); *H04L 63/0876* (2013.01); *H04L 2463/102* (2013.01)

(58) Field of Classification Search
CPC ............. A63F 13/12; H04L 2463/102; G06F 2221/2135; G06F 2221/2141
USPC ............... 705/26.1, 26.2, 26.25, 26.3, 26.35, 705/26.4, 26.41–26.44, 26.5, 26.61–26.64, 705/26.7, 26.8, 26.81, 26.82, 26.9, 27.1, 705/27.2
See application file for complete search history.

(56) References Cited

U.S. PATENT DOCUMENTS

| | | | | |
|---|---|---|---|---|
| 5,446,489 | A * | 8/1995 | Egendorf | 725/1 |
| 5,621,728 | A * | 4/1997 | Lightfoot et al. | 370/397 |
| 6,418,557 | B1 * | 7/2002 | Otani | 725/96 |
| 7,281,046 | B1 * | 10/2007 | Sunderasan et al. | 709/228 |
| 7,493,289 | B2 | 2/2009 | Verosub et al. | |
| 7,509,421 | B2 * | 3/2009 | Lambert | G06F 21/10 709/217 |
| 7,789,757 | B2 * | 9/2010 | Gemelos et al. | 463/42 |
| 2004/0193919 | A1 * | 9/2004 | Dabbish et al. | 713/201 |
| 2005/0198677 | A1 | 9/2005 | Lewis | |
| 2006/0184971 | A1 | 8/2006 | Shin | |
| 2007/0005467 | A1 * | 1/2007 | Haigh et al. | 705/35 |
| 2007/0143457 | A1 | 6/2007 | Mao et al. | |
| 2010/0031281 | A1 | 2/2010 | Kim et al. | |
| 2010/0115627 | A1 * | 5/2010 | Chow et al. | 726/28 |

OTHER PUBLICATIONS

Dermot Nolan "Bottlenecks in pay television", Telecommunications Policy, vol. 21, No. 7, pp. 597-610, © 1997 Elsevier Science Ltd.*
Kayvan Miri Lavassani et al. "Broadband Internet adoption challenge" Transforming Government: People, Process and Policy vol. 8 No. 4, 2014 pp. 620-644.*

* cited by examiner

*Primary Examiner* — Naeem Haq
(74) *Attorney, Agent, or Firm* — Sutherland Asbill & Brennan LLP

(57) ABSTRACT

Systems and methods for facilitating purchases of broadband content and services are provided. A request to purchase broadband content or a broadband service may be received by a server from a customer device. A transaction associated with the received purchase request may be completed in real-time. Based upon the completion of the transaction, one of (i) access rights associated with the broadband content or (ii) a feature set associated with the broadband service may be altered. The requested broadband content or broadband service is then made available to the customer.

18 Claims, 4 Drawing Sheets

SYSTEMS AND METHODS FOR FACILITATING PURCHASES OF BROADBAND CONTENT AND SERVICES

FIELD OF THE INVENTION

Aspects of the invention relate generally to the provisioning of broadband content and services, and more particularly, to the facilitation of purchases of broadband content and services.

BACKGROUND OF THE INVENTION

A wide variety of service providers, such as cable providers and satellite providers, provide entertainment services to customers, including television services, on demand programming services, pay-per-view ("PPV") services, and other entertainment and/or informational services. In many situations, a customer is required to purchase content from a service provider. For example, a customer is typically required to purchase PPV content, such as PPV movies, and upgraded programming content, such as a sports package.

FIG. 1 illustrates a block diagram representation of a conventional PPV purchasing system. With reference to FIG. 1, one or more guide data providers 105 typically provide guide data 107 to a guide server 110. The guide data 107 is indicative of the programming content that is offered by various content providers, including PPV content that is available for purchase. The guide server 110 generates an interactive electronic program guide ("EPG") that is communicated to a set-top box ("STB") 115 associated with a customer. The EPG typically includes a listing of programs that are broadcast or output by the service provider for reception by customers, as well as programming content that is available for purchase. The listing is often organized by channel and by time slots. Once received by the STB 115, the EPG is typically displayed to the customer using an electronic program guide application.

When a customer desires to purchase broadband content, such as a PPV event, the customer typically enters a purchase request into the STB 115. A purchase amount associated with the desired content is compared to a predetermined credit limit 117 for the customer that is typically stored on the STB 115. The credit limit 117 is typically determined or calculated by a billing and provisioning system 120 and communicated to the STB 115 at periodic time intervals. If the credit available to the customer is sufficient to facilitate the purchase, stored data 119 associated with the purchase event is stored on the STB 115 for subsequent polling by the billing and provisioning system 120. Additionally, an indication of the purchase is typically communicated to the billing and provisioning system 120. The billing and provisioning system 120 directs a conditional access system ("CAS") controller 125 to provide the customer with access to PPV events in general, and the CAS controller 125 directs one or more CAS encryption devices 130 to encrypt a data stream associated with the purchasable content. The STB 115 then decrypts the data stream following a purchase at the STB 115. The customer may then utilize the STB 115 to view the purchased PPV event. However, the customer is not automatically permitted to utilize other devices, such as other set-top boxes in the customer's home, to view the purchased PPV event.

With continued reference to FIG. 1, the billing and provisioning system 120 typically polls the STB 115 at periodic time intervals in order to determine whether any purchases have been made. In many conventional systems, the billing and provisioning system 120 requests stored purchase data 119 from the STB 115. If one or more purchases have been made, then the billing and provisioning system 120 charges a customer account for the purchases. With the conventional polling approach, there is a risk that purchase events will become stale and/or that stored data associated with purchases will not be collected by the billing and provisioning system 120, thereby resulting in lost revenue on the part of the service provider. Additionally, in the case of multiple set-top boxes associated with an account, the polling approach may result in discrepancies between the aggregate purchases that have been made and the credit limit that is available to the customer.

Accordingly, improved systems and methods for facilitating purchases of broadband content and services are desirable. More specifically, systems and methods that facilitate real-time purchases of broadband content and services are desirable.

BRIEF DESCRIPTION OF THE INVENTION

Some or all of the above needs and/or problems may be addressed by certain embodiments of the invention. Embodiments of the invention may include systems and methods for facilitating purchases of broadband content and services. In one embodiment, a method for facilitating the purchase of broadband content or a broadband service may be provided. A request to purchase broadband content or a broadband service may be received by a suitable server, such as an application server that includes any number of computers or computing devices. The request may be received from a customer device associated with a customer. In real-time, the server may direct the completion of a transaction associated with the received purchase request. Based upon the completion of the transaction, the server may alter or direct the alteration of one of (i) access rights associated with the requested broadband content or (ii) a feature set associated with the requested broadband service. The requested broadband content or broadband service may then be made available to the customer.

In accordance with another embodiment of the invention, a system for facilitating the purchase of broadband content or a broadband service may be provided. The system may include at least one communications interface and at least one processor. The at least one communications interface may be configured to receive, from a customer device associated with a customer, a request to purchase broadband content or a broadband service. The at least one processor may be configured to (i) direct, in real-time, the completion of a transaction associated with the received purchase request, and (ii) alter, based upon the completion of the transaction, one of (a) access rights associated with the broadband content or (b) a feature set associated with the broadband service. The requested broadband content or broadband service may then be made available to the customer.

In accordance with another embodiment of the invention, a method for facilitating a purchase of broadband content or a broadband service may be provided. A request to purchase broadband content or a broadband service may be received by an application server that includes any number of computers or computing devices. The request may be received from a customer device associated with a customer. The application server may identify an account associated with the customer. Based at least in part upon the identified account, the application server may direct the completion of a real-time transaction associated with the received purchase request. The completion of the transaction may result in an alteration of one of (i) access rights associated with the requested broadband content or (ii) a feature set associated with the requested broadband service. The requested broadband content or broadband service may then be made available to the customer.

Additional systems, methods, apparatus, features, and aspects may be realized through the techniques of various embodiments of the invention. Other embodiments and aspects of the invention are described in detail herein with reference to the description and to the drawings and are considered a part of the claimed invention.

BRIEF DESCRIPTION OF THE DRAWINGS

Reference will now be made to the accompanying drawings, which are not necessarily drawn to scale, and wherein.

DETAILED DESCRIPTION

Figure 1:
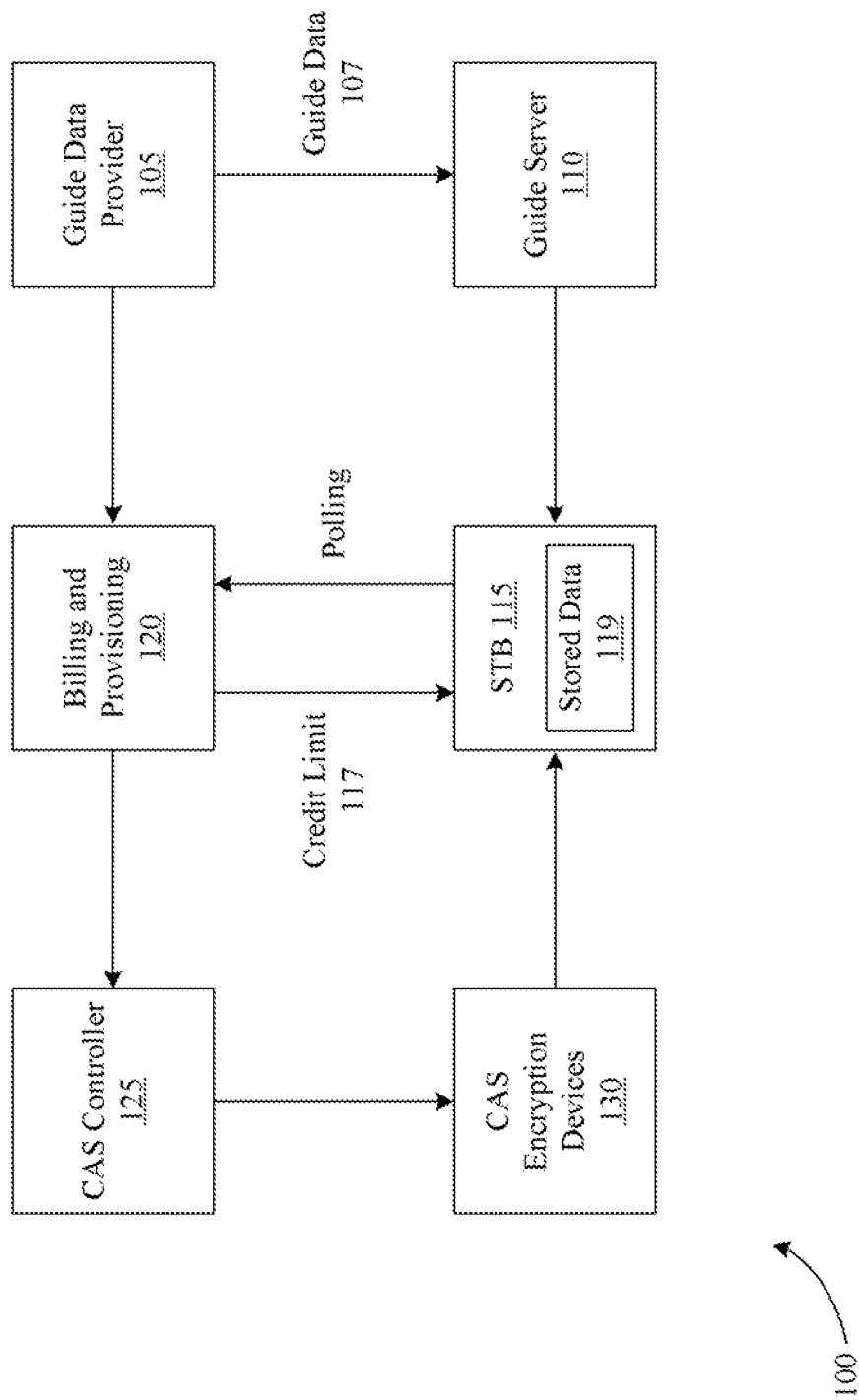
FIG. 1 illustrates a block diagram of a conventional system that facilitates the purchase of pay-per-view content.

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may include systems and methods for facilitating the purchase of broadband content and/or broadband services. In certain embodiments, a suitable server, such as an application server associated with a service provider (e.g., a cable provider, satellite service provider, etc.), may receive a purchase request from a customer device. The request may be received from a wide variety of different types of customer devices, such as a customer set-top box ("STB"), a mobile device (e.g., mobile telephone), or a Web-enabled device. In certain embodiments, the request may be received via a purchase application that is executing on a customer device or via a suitable purchasing website. A wide variety of products and/or services may be requested in a purchase request as desired in various embodiments of the invention. In certain embodiments, a purchase request may include a request for broadband content, such as a request for a pay-per-view ("PPV") event, or a request for a programming package (e.g., a sports package, etc.). In other embodiments, a purchase request may include a request for a broadband service, such as an upgrade in a cable service or satellite service package, a request for Voice over Internet Protocol ("VoIP") telephone service, a request for Internet service, etc. In yet other embodiments, a purchase request may include a request for physical goods or products and/or for services offered by another service provider. For example, a customer may shop for goods or services utilizing a customer device, and the customer may communicate a purchase request for various goods or products to the application server.

Once a purchase request has been received by the application server, the application server may identify a customer account associated with the customer device, such as a cable or satellite billing account. The application server may then direct the completion of a transaction associated with the purchase request in real-time or near real-time. For example, the application server may direct a billing and provisioning system or application to charge the customer account for an amount associated with the purchase request. In this regard, a purchase transaction may be completed when a purchase request is made, thereby reducing or eliminating stale purchases.

Once a transaction has been completed for broadband content or a broadband service, access rights and/or feature sets associated with the requested broadband content or broadband service may be altered, thereby making the purchased content and/or services available to the customer. For example, a conditional access system ("CAS") controller may alter access rights for PPV content and/or other program content. As another example, a CAS controller and/or another service provider head end device may upgrade or otherwise alter the content features and/or services that are provided to a customer. For example, additional broadband service may be provided to a customer. According to an aspect of the invention, purchased broadband content and/or services may be made available to the customer via any number of customer devices. For example, purchased broadband content may be made available to the customer via one or more set-top boxes, mobile devices, Web-enabled devices, and/or other devices associated with the customer account. In certain embodiments, a customer may request broadband content and/or services via a first device, and the customer may view, access, or otherwise utilize purchased content and/or services via a second device. As desired, access rights and/or capabilities associated with a wide variety of customer devices may be evaluated when a purchase request is processed, and purchased content and/or services may be made available to the customer via one or more devices that are identified as available for and/or capable of providing the requested content and/or services to the customer.

According to an aspect of the invention, a customer may also utilize a customer device to request the purchase of a wide variety of goods or services. Once a transaction for goods or services has been completed, the application server and/or another service provider head end device may direct or request a suitable provider of the purchased goods or services to deliver the goods or services to the customer. For example, the shipment of purchased goods may be arranged or directed. As another example, a purchased service may be ordered and/or scheduled.

System Overview

An example system 200 for facilitating the purchase of broadband content, broadband services, and/or other goods and services will now be described illustratively with respect to FIG. 2. The system 200 may include, for example, an application server and fulfillment system 205 (hereinafter an "application server"), a billing and provisioning system 210, one or more client devices 215, 235 or customer devices, a guide server 220, a head end CAS controller 225, and/or one or more CAS encryption devices 230. As desired, one or more components of the system 200 may be processor-driven components or devices. Additionally, in certain embodiments, certain components of the system 200 may be combined. For example, a single processor-driven component may function as the application server 205 and the billing and provisioning system 210.

Figure 2:
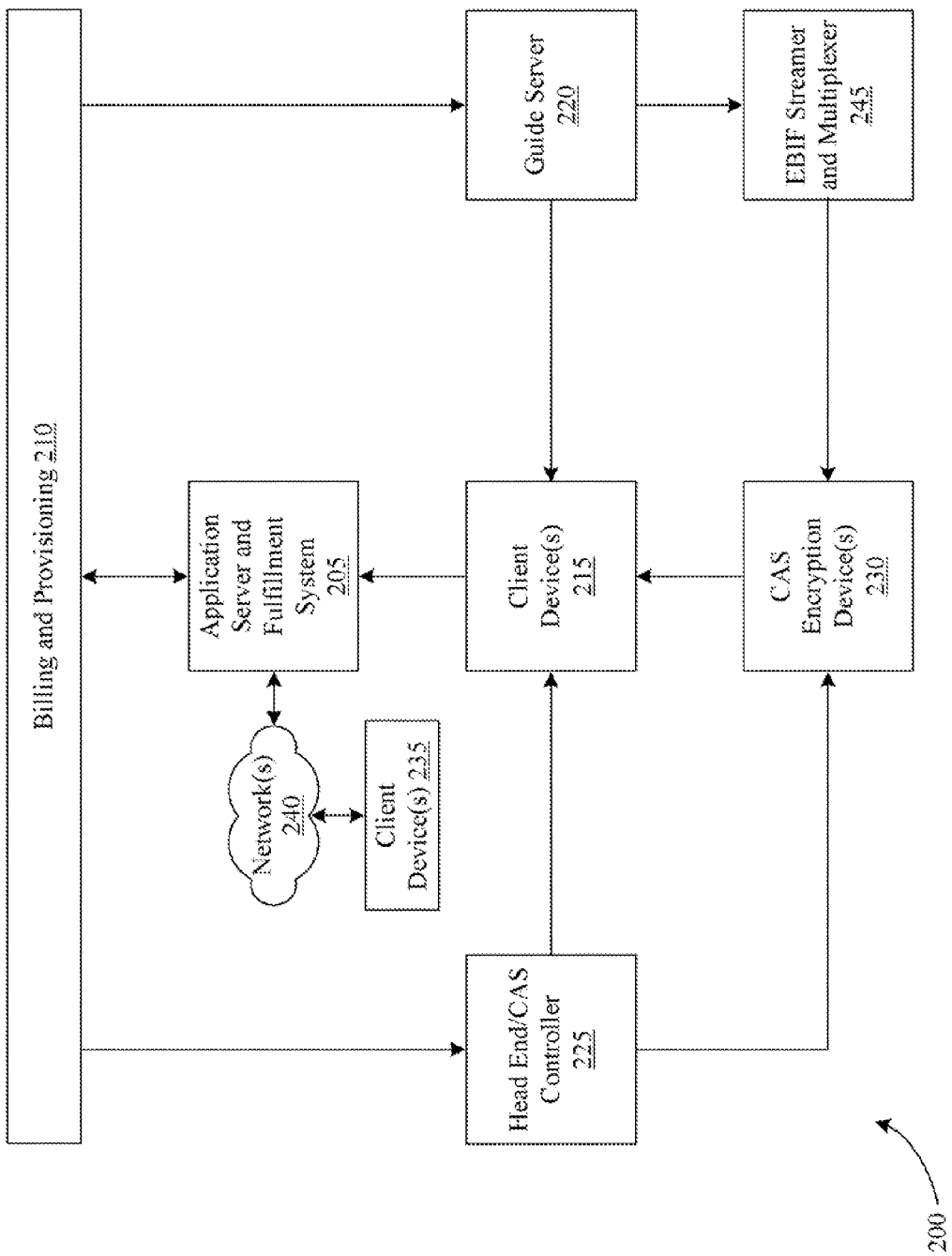
FIG. 2 illustrates a block diagram of an example system that may be utilized to facilitate the purchase of broadband content and/or broadband services, according to an example embodiment of the invention.

With reference to FIG. 2, the application server 205 may be a suitable device, server, or other component of the system 200 that facilitates the receipt and processing of a customer or client purchase request. The application server 205 may be associated with an underlying service provider, such as a cable service provider, satellite service provider, or other service provider. The application server 205 may be a suitable processor-driven device that is configured to execute computer-readable, computer-implemented, or computer-executable instructions. For example, the application server 205 may include one or more server computers, personal computers, digital assistants, personal digital assistants, digital tablets, Internet appliances, application-specific circuits, microcontrollers, minicomputers, or other processor-based devices. The execution of suitable computer-implemented instructions by the application server 205 may form a special purpose computer or other particular machine that is operable to facilitate the receipt and processing of purchase requests. Although a single application server 205 is illustrated, the operations and/or control of the application server 205 may be distributed among any number of devices, computers, and/or processing components.

In operation, the application server 205 may receive a purchase request from a client device or customer device, such as the client devices 215, 235 described below. In certain embodiments, the application server 205 may receive a purchase request via one or more suitable purchase portals that are provided by, maintained by, and/or otherwise associated with the application server 205. A wide variety of different types of purchase requests may be received as desired in various embodiments of the invention, including but not limited to requests for broadband content (e.g., a PPV movie, a PPV event, a programming package, downloadable music, other audio content, downloadable video content, other video content, etc.), requests for a broadband service (e.g., an upgrade or alteration in a cable or satellite television service or package, an upgrade or alteration in a VoIP telephone service, an upgrade or alteration in an Internet service, an upgrade or alteration in a home monitoring service, the addition of an existing or new service offered by the service provider, etc.), requests for goods or products (e.g., consumer goods and/or products), and/or requests for services offered by any number of merchants and/or consumer service providers (e.g., cleaning services, lawn services, professional services, etc.). The types of purchase requests listed above are provided by way of example only.

A wide variety of communications networks and/or communications interfaces may be utilized as desired to communicate a purchase request to the application server 205. For example, a customer or client may utilize a set-top box ("STB") or other suitable programming processing component (e.g., a virtual STB, an embedded STB, etc.) to communicate a purchase request to the application server 205 via a service provider network, such as a cable network or satellite network. As one example, a customer may select a product or service offering utilizing a suitable input device, such as a remote control, and a purchase request may be communicated in an upstream cable communication to an application server 205 that is situated at a cable head end. As another example, a customer or client may utilize a mobile device, personal computing device, and/or a Web-enabled device to navigate one or more Web pages or other graphical user displays, and the customer may communicate a purchase request to the application server 205 via any number of suitable networks 240, such as the Internet, a wide area network, a cellular network, a Wi-Fi enabled network, etc.

Once a purchase request has been received, the application server 205 may process the received request and direct the completion of a purchase transaction in real-time or near real-time. For example, the application server 205 may direct the billing and provisioning system 210 to charge a customer account (e.g., a cable account) for a purchase amount associated with the requested content, products, and/or services. In certain embodiments, the application server 205 and/or the billing and provisioning system 210 may identify a customer account (e.g., a cable billing account, etc.) associated with the client device and/or the customer. For example, a device identifier associated with the client device may be identified and utilized to identify a customer account. The application server 205 and/or the billing and provisioning system 210 may also identify a purchase amount associated with the purchase request. The billing and provisioning system 210 may then bill or charge the customer account for an amount associated with the purchase amount. For example, the purchase amount may be billed, a portion of the purchase amount may be billed, or an amount that is greater than the purchase amount may be billed such that a portion of the billed amount may be retained by the service provider. As a result of billing a customer account in real-time or near real-time, stale purchases may be reduced or eliminated. In other words, problems associated with the failure to accurately obtain billing information from customer set-top boxes may be alleviated.

Once a purchase transaction has been directed and/or completed, the purchased content, products, and/or services may be made available to the customer. In certain embodiments, the application server 205 and/or the billing and provisioning system 210 may direct the head end CAS controller 225 to modify access rights associated with requested broadband content. For example, the CAS controller 225 may be directed to alter or modify access rights for broadband content (e.g., movies, television shows, music, etc.) such that the customer may utilize one or more client devices 215, 235, to access the content. A wide variety of access rights may be altered or modified as desired in various embodiments of the invention. Additionally, access rights for any number of client devices 215, 235 may be modified as desired. For example, access rights may be altered or modified to permit a customer to utilize one or more devices to view a desired PPV event that is included in a content stream (e.g., to view a purchased PPV event at a designated time slot); to view, listen to, or otherwise access desired content (e.g., movie, television show, music, etc.) a predetermined number of times (e.g., once, twice, etc.); to view, listen to, or otherwise access desired content for a predetermined time period (e.g., one day, one week, etc.); and/or to access a specific content stream or portion of a content stream (e.g., a television channel, etc.) for a predetermined period of time (e.g., one day, one week, etc.).

In other embodiments, the application server 205 and/or the billing and provisioning system 210 may direct the CAS controller 225 and/or another component or system associated with the service provider to alter or modify a feature set associated with a customer account (e.g., a cable billing account) and/or the broadband services that are provided to a customer. For example, if a customer has purchased one or more additional broadband services, such as Internet services, VoIP telephone services, etc., then the feature set associated with the customer account may be altered to reflect the purchase of the additional service(s). The customer may then be permitted to utilize one or more client devices 215, 235 to take advantage of or utilize the additional service(s). As one example, a feature set for a customer account may be modified to include a VoIP telephone service. A customer STB may then be reprogrammed to facilitate the provision of the purchased VoIP service. As desired, a customer service representative or field technician may be scheduled to install additional hardware at a customer household or location to facilitate the provision of the additional service(s).

In yet other embodiments, the application server 205 and/or the billing and provisioning system 210 may direct the shipment of purchased goods or products to a designated customer location, such as a customer household or alternative address designated by the customer. For example, a merchant or distributor may be directed to ship or deliver purchased goods or products to a customer. Alternatively, the customer may be instructed to pick up purchased goods or products from a specified distribution location. Similarly, the application server 205 and/or the billing and provisioning system 210 may direct a provider of a purchased service (e.g., a lawn maintenance service, a cleaning service, etc.) to contact the customer and schedule a convenient time to provide a purchased service. In certain embodiments, the application server 205 and/or the billing and provisioning system 210 may facilitate the scheduling of the service. In this regard, a customer may utilize a client device to purchase various goods and/or services that will subsequently be delivered and/or provided to the customer. The customer's account (e.g., cable billing account) associated with the service provider may be billed for the goods and/or services, and the customer may be invoiced at a later date.

In accordance with an aspect of the invention, purchased broadband content and/or services may be accessed by a plurality of client devices 215, 235 associated with a customer. For example, a PPV movie may be accessed utilizing a plurality of set-top boxes and/or other devices associated with the customer. In certain embodiments, a customer may utilize any suitable client devices associated with a customer account to access purchased broadband content and/or services. Additionally, content and/or services may be purchased utilizing a first client device and accessed by the customer utilizing one or more other client devices. For example, a customer may utilize a Web-enabled client device to purchase broadband content, and the customer may subsequently utilize the Web-enabled device, a set-top box, and/or other client device(s) to access the content. In this regard, a cross-platform purchasing system may be provided.

As desired, a determination may be made as to the client devices 215, 235 that are permitted to and/or capable of displaying, outputting, or otherwise providing purchased content and/or services to the customer, and the customer may be permitted to access purchased content utilizing one or more client devices that are capable of and/or permitted to access the content. For example, although a customer may be permitted to utilize a mobile device to purchase a PPV movie, the customer may not be permitted to access the purchased movie utilizing the mobile device if the mobile device is not capable of displaying the movie.

The billing and provisioning system 210 or billing and provisioning server may be a suitable device, server, or other component of the system 200 that facilitates the completion of a purchase transaction associated with a received purchase request. Similar to the application server 205, the billing and provisioning system 210 may be associated with an underlying service provider, such as a cable service provider, satellite service provider, or other service provider. The billing and provisioning system 210 may be a suitable processor-driven device that is configured to execute computer-readable, computer-implemented, or computer-executable instructions. For example, the billing and provisioning system 210 may include one or more server computers, personal computers, digital assistants, personal digital assistants, digital tablets, Internet appliances, application-specific circuits, microcontrollers, minicomputers, or other processor-based devices. The execution of suitable computer-implemented instructions by the billing and provisioning system 210 may form a special purpose computer or other particular machine that is operable to facilitate the completion of a transaction associated with a purchase request in real-time or near real-time. Although a single billing and provisioning system 210 is illustrated, the operations and/or control of the billing and provisioning system 210 may be distributed among any number of devices, computers, and/or processing components.

In operation, the billing and provisioning system 210 may receive and/or otherwise obtain information associated with a purchase request, such as an identification of desired content, products, and/or services, an identifier associated with a client device 215, 235, an identifier of a customer account, and/or a purchase amount. The billing and provisioning system 210 may complete a transaction associated with the purchase request in real-time or near real-time, and the billing and provisioning system 210 may bill the customer account for an amount associated with the purchase amount. As desired, the billing and provisioning system 210 may conduct a wide variety of different types of risk analyses prior to approving and/or completing a purchase transaction. For example, the billing and provisioning system 210 may evaluate the purchase amount utilizing a credit limit associated with the customer, and the billing and provisioning system 210 may determine whether or not the transaction should be completed based upon the analysis.

As desired, the billing and provisioning system 210 may determine whether the customer is eligible to purchase the desired content, products, and/or services. In certain embodiments, the billing and provisioning system 210 may direct the application server 205 and/or another component of the system 200 to prompt the customer for identifying information and/or access credentials (e.g., a user name and/or password) that may be validated by the billing and provisioning system 210 in order to determine whether the customer is permitted to purchase the desired content, products, and/or services.

Once a transaction has been completed, the billing and provisioning system 210 and/or the application server 205 may instruct the CAS controller 225 to alter or modify access rights associated with purchased content. In this regard, the customer may be permitted to access purchased broadband content. For a purchase of broadband services, the billing and provisioning system 210 may alter or modify a feature set associated with the customer account and/or instruct the CAS controller 225 or another component of the system 200 to modify the feature set. The CAS controller 225 may then be instructed to provide content streams and/or other information associated with the purchased broadband content to the customer. Additionally or alternatively, the billing and provisioning system 210 may direct the shipment or provision of goods or services to a customer.

In certain embodiments of the invention, the billing and provisioning system 210 may additionally include or be in communication with a data repository (e.g., a database, etc.) that maintains a list of available broadband content, such as a list of PPV information. When a purchase transaction is completed, identifiers and/or other information associated with the purchased broadband content and/or services may be communicated to the CAS controller 225 in order to facilitate the alteration or modification of access rights and/or feature sets. Additionally, PPV information and/or other programming information may be communicated by the billing and provisioning system 210 to the guide server 220 in order to facilitate the generation of guide data that is presented to a customer. For example, PPV information may be communicated to the guide server for incorporation into an electronic program guide data file that is communicated to a client device 215, such as a STB.

With continued reference to FIG. 2, any number of client devices 215 may be provided. One example of a suitable client device is a programming processing component and/or software module that is capable of receiving and processing a broadband signal (e.g., a cable signal, satellite signal, etc.) output by a service provider. Examples of suitable programming processing components include, but are not limited to, a set-top box ("STB") (e.g., a cable STB, a digital satellite STB, an Internet Protocol Television STB, etc.), a virtual STB, an embedded STB, etc. In certain embodiments, a programming processing component may be connected to a display device associated with a customer, such as a television. In other embodiments, a programming processing component may be embedded, incorporated into, and/or executed on the display device. For purposes of this disclosure, the client devices 215 that are capable of processing broadband signals will be referred to as set-top boxes 215. In operation, a STB 215 may receive at least a portion of a broadband data signal that is output by a service provider and convert at least a portion of the received signal into content which is displayed or otherwise output by the display device. As desired, the STB may receive a broadband data signal via any number of suitable networks, such as a cable network that includes any number of optical fibers, coaxial cables, and/or cable drops, a satellite network that includes a suitable satellite dish and/or connecting cables, and/or other suitable networks. Additionally, any number of intermediary devices, such as broadband modems, routers, etc., may be situated between the source of a broadband signal and the programming processing component. According to an aspect of the invention, any number of set-top boxes may be associated with a customer and/or a customer account.

A broadband signal that is provided to a STB 215 may include a wide variety of data components, including but not limited to, a television signal, a digital television signal, data associated with a Voice over Internet Protocol ("VoIP") telephone service, data associated with Internet service, data associated with home monitoring services, etc. The STB 215 may receive and process the broadband signal. As desired, the STB 215 may selectively output a portion of the broadband signal, such as digital television data (e.g., audio and/or video data), electronic program guide ("EPG") data, various Web pages, etc.

The STB 215 may be a suitable processor-driven device that facilitates the receipt, processing, and/or output of a broadband signal, EPG data, and/or offer data. Additionally, the STB 215 may be a suitable processor-driven device that facilitates the receipt of a purchase command for various content, products, and/or services and/or the communication of a purchase request to the application server 205. As such, the STB 215 may include any number of computing devices, such as a personal computer, a digital assistant, a personal digital assistant, a digital tablet, an Internet appliance, an application-specific circuit, a microcontroller, a minicomputer, or any other processor-based device. The execution of suitable computer-implemented instructions or computer-executable instructions by the STB 215 may form a special purpose computer or other particular machine that is operable to facilitate the processing and/or output of a broadband signal and/or the receipt of purchase commands and the generation and/or output of one or more purchase requests.

In certain embodiments, the STB 215 may output one or more offers and/or other information to a customer that facilitates the receipt of purchase commands for various content, products, and/or services. Additionally, as desired, the STB 215 may be configured to execute any number of applications and/or software modules that facilitate the receipt of a purchase command and/or the communication of a purchase request to the application server. For example, information associated with a PPV event may be presented to or displayed to a customer by an EPG application. Navigation to and selection of the PPV event by a customer may facilitate the receipt of a purchase command from a customer and communication of a purchase request for the PPV event to the application server 205. As another example, an application that facilitates the purchase of a PPV event and/or a broadband service may be launched when a customer navigates to a particular television channel or entry in an electronic program guide. As yet another example, the STB 215 may be configured to display one or more navigable Web pages or other graphical user interfaces ("GUIs") to a customer that facilitate the request of various products and/or services. As another example, an icon or indicator associated with purchasing a product or service may be displayed to a customer along with television content (e.g., a commercial, an infomercial, etc.), and receipt of a suitable user command (e.g., a remote control input, a voice command, etc.) may be configured to launch an application that facilitates the receipt of a purchase command from a customer. The techniques set forth above for receiving a purchase request are provided by way of example only, and it will be appreciated that a wide variety of other techniques may be utilized by a STB 215 to receive a purchase command from a customer.

In certain embodiments, the STB 215 may include an EPG application. The EPG application may be a suitable software module configured to identify, process, and format EPG data that is received by the STB 215 in a broadband signal. The EPG application may format received EPG data for presentation to a customer via an EPG grid. For example, received EPG data may be parsed and organized by channel and time slot. The organized data may then be formatted for display in an EPG grid. When a customer command or request for EPG data, such as a selection of a remote control button or option associated with requesting guide data, is received, the EPG application may direct the output of the EPG grid for presentation to the customer via the display device. In this regard, a customer may be presented with a list of available programming options, including available PPV events and/or other programming content that may be purchased. Once presented, a customer may navigate through the displayed EPG grid. The customer may select an individual entry that is included in the grid, such as an entry associated with a PPV event. In certain embodiments the selection of a grid entry and/or navigation to a channel associated with a PPV event or other content that may be purchased facilitates the receipt of a purchase request by the STB 215. In certain embodiments, an executable application, such as an application embedded in, linked to, and/or otherwise associated with EPG data and/or a particular channel, may be executed, and the application may facilitate the receipt of a purchase command. As desired, a wide variety of different types of applications may be executed, such as an Enhanced Television Binary Interchange Format ("EBIF") application or other types of applications (e.g., a Java application, an AppleScript applications, a Visual Basic for Applications ("VBA") application, a Common List Object System ("CLOS") application, an Eiffel application, a Sather application, a Perl application, an Obliq application, etc.), may be executed to facilitate the receipt of a purchase command from a customer and the communication of a purchase request to the application server 205.

Regardless of the method or technique utilized to receive a purchase command (e.g., an EPG, a purchase application, a transaction GUI, etc.), once a purchase command has been received by the STB 215, a purchase request may be generated and communicated to the application server 205 via a suitable service provider network, such as a cable network or satellite network. For example, a purchase request may be communicated to a cable head end and an application server 205 associated with the cable head end. A wide variety of information may be included in a purchase request, such as an indication of desired content, products, and/or services, one or more individual purchase amounts, a total purchase amount, an identifier of the STB 215, an identifier of the customer, access credentials for the customer, etc. The application server 205 may process a purchase request to facilitate the completion of a purchase transaction and/or the provision or delivery of purchased content, goods, and/or services to the customer.

In addition to client devices 215 that communicate with the application server 205 via a service provider head end (e.g., a cable head end) and/or a service provider network (e.g., a cable network), a wide variety of other types of client devices may be utilized by a customer to communicate with the application server 205. For example, any number of client devices 235, such as mobile devices, personal computers, etc., may be configured to receive purchase commands from customers and communicate purchase requests to the application server 205 via any number of suitable networks 240, such as the Internet, a wide area network, a Wi-Fi network, etc.

In certain embodiments, a client device 235 may be a suitable processor-driven device that facilitates the receipt of a purchase command from a customer and/or the communication of a purchase request to the application server 205. As such, the client device 235 may include any number of computing devices, such as a personal computer, a digital assistant, a personal digital assistant, a digital tablet, an Internet appliance, an application-specific circuit, a microcontroller, a minicomputer, or any other processor-based device. Examples of suitable client devices 235 include, but are not limited to, a mobile device (e.g., a mobile phone, personal digital assistant, etc.), a personal computer, a digital tablet, etc. The execution of suitable computer-implemented instructions or computer-executable instructions by the client device 235 may form a special purpose computer or other particular machine that is operable to facilitate the receipt of a purchase command and/or the communication of a purchase request.

In operation, a customer may utilize a client device 235 to select content, services, and/or products for purchase. For example, the customer may utilize the client device 235 to navigate through various Web pages and/or GUIs that display items and/or services that may be purchased. In certain embodiments, the customer may utilize an application associated with the service provider (e.g., a designated browsing application, a program guide application, a digital video recorder application, etc.) and/or navigate through one or more Web pages and/or GUIs provided by the service provider. Once a customer has selected content, services, and/or products for purchase, the customer may utilize one or more input devices associated with the client device 235, such as a touch screen display, a keypad, a microphone, a mouse, a keyboard, etc., to enter a purchase command associated with the desired content, services, and/or products. The client device 235 may be configured to generate a purchase request associated with the desired content, and the purchase request may be communicated to the application server 205 via any number of suitable networks 240 (e.g., the Internet, a cellular network, a Wi-Fi network, etc.) and/or utilizing any number of suitable communications techniques and/or methods, such as a secure Web interface, another Web interface, short message service ("SMS") messaging, email, etc.

With continued reference to FIG. 2, the guide server 220 may be configured to output EPG data for receipt by one or more client devices 215, such as one or more set-top boxes. Similar to other components of the system 200, the guide server 220 may be associated with an underlying service provider, such as a cable service provider, satellite service provider, or other service provider. The guide server 220 may receive guide data, programming information, and/or content information from the billing and provisioning system 210 and/or any number of content providers, such as television content providers, PPV content providers, on demand content providers, etc. The guide server 220 may utilize at least a portion of the received information to generate or construct EPG data that may be output for communication to any number of client devices 215. Additionally, in certain embodiments, the guide server 220 may associate one or more additional programs with the EPG data.

The guide server 220 may include any number of suitable processor-driven devices that facilitate the generation of EPG data and/or the association of one or more additional applications with the EPG data. As such, the guide server 220 may include any number of computing devices, such as a server computer, a personal computer, a digital assistant, a personal digital assistant, a digital tablet, an Internet appliance, an application-specific circuit, a microcontroller, a minicomputer, or any other processor-based device. The execution of suitable computer-implemented instructions by the guide server 220 may form a special purpose computer or other particular machine that is operable to facilitate the generation of EPG data and/or the association of one or more additional applications with the EPG data. Although a single guide server 220 is described below, the operations and/or control of the guide server 220 may be distributed among any number of devices, computers, and/or processing components.

In operation, the guide server 220 may receive programming content information (e.g., PPV information, television programming information, etc.) from the billing and provisioning system 210 and/or any number of content providers. The guide server 220 may utilize at least a portion of the received programming content information to generate EPG data, an EPG file, and/or an EPG data stream that may be processed by a client device 215 to construct an EPG display that is presented to a customer. In certain embodiments, the guide server 220 may incorporate or direct the incorporation of generated EPG data into one or more broadband signals (e.g., a cable television signal, a satellite data stream, etc.) that are output for downstream transmission to one or more client devices 215. The EPG data may include scheduling information for any number of channels and time slots that may be viewed by customers of the service provider. Additionally, the EPG data may include data associated with scheduled television shows, movies, PPV features, and/or other types of content that may be mapped to an EPG grid by a client device 215. For example, the formatted and/or generated EPG data may include on-time, on-channel guide data. A wide variety of information may be included in the EPG data as desired in various, embodiments, such as descriptive information for one or more shows, timing information for one or more shows, etc.

In certain embodiments of the invention, the guide server 220 may additionally be configured to associate one or more additional applications with EPG data. For example, an application may be associated with EPG data such that a customer selection of an entry in a displayed EPG grid may result in the additional application being executed by the client device 215. A wide variety of suitable techniques may be utilized as desired to associate an additional application with EPG data. For example, an entire application may be incorporated into EPG data and associated with a grid entry included in the EPG data. As another example, a pointer or link to an application may be incorporated into EPG data and associated with a grid entry. In this regard, when the grid entry is selected by a customer, the pointer or link may be utilized to access the additional application from a data source, such as the guide server 220, a separate application server on which the application is stored, a carousel or looping data stream that is accessible by the client device 215 (e.g., a carousel data stream that is included in a broadband data signal provided to the STB or other client device 215), a local memory that is associated with or incorporated into the client device 215, or any other suitable data source. In certain embodiments, the pointer or link may be a pointer to a memory location at which the application is stored. In other embodiments, the pointer or link may include a Universal Resource Locator ("URL") that is utilized to access a server that hosts the application.

A wide variety of different types of applications may be associated with EPG data as desired in various embodiments. One example application is a pay-per-view ("PPV") application that facilitates the purchase of a PPV event. For example, when a customer selects an EPG grid entry associated with a PPV event, the PPV application may be executed or launched. The PPV application may then manage a purchase of the PPV event by the subscriber. In certain embodiments, the PPV application may facilitate direct interaction with the application server 205 to manage the purchase of the PPV event. Additionally, applications that are associated with EPG data may be programmed utilizing any number of suitable programming techniques and/or programming languages. For example, an associated application may be an Enhanced Television Binary Interchange Format ("EBIF") application or applet, a Java application or applet, an AppleScript application, a Visual Basic for Applications ("VBA") application, a Common List Object System ("CLOS") application, an Eiffel application, a Sather application, a Pert application, an Obliq application, and/or an application that utilizes another suitable programming language or protocol that can be interpreted by a client device 215.

Once a purchase of broadband content and/or a broadband service has been completed, the customer may be granted access to the purchased content and/or service. For example, the customer may utilize any number of set-top boxes and/or other client devices associated with a customer account to access purchased broadband content and/or services. According to an aspect of the invention, the customer may access purchased content and/or services via any number of suitable customer devices once a purchase transaction has been completed.

The head end CAS controller 225 may be a suitable processor-driven device that is configured to maintain, modify, and/or alter access rights and/or feature sets associated with any number of customers and/or client devices 215 associated with customer accounts. In this regard, the CAS controller 225 may control the broadband content and/or services that are accessible by customers of the service provider. Similar to other components of the system 200, the CAS controller 225 may be associated with an underlying service provider, such as a cable service provider, satellite service provider, or other service provider. The CAS controller 225 may include any number of suitable processor-driven devices that facilitate the maintenance and/or alteration of access rights and/or feature sets associated with broadband content and/or services. As such, the CAS controller 225 may include any number of computing devices, such as a server computer, a personal computer, a digital assistant, a personal digital assistant, a digital tablet, an Internet appliance, an application-specific circuit, a microcontroller, a minicomputer, or any other processor-based device. The execution of suitable computer-implemented instructions by the CAS controller 225 may form a special purpose computer or other particular machine that is operable to facilitate the maintenance and/or alteration of access rights and/or feature sets. Although a CAS controller 225 is described below, the operations and/or control of the CAS controller 225 may be distributed among any number of devices, computers, and/or processing components.

In operation, the CAS controller 225 may receive an indication from the billing and provisioning system 210 and/or the application server 205 that identified broadband content and/or services should be made available to a particular customer and/or to one or more client devices 215 associated with the customer or a customer billing account. For example, an indication may be received once a purchase transaction for broadband content and/or services has been completed. Based upon the received indication, the CAS controller 225 may alter or modify access rights associated with identified broadband content and/or a feature set associated with identified broadband services that are included in a broadband signal output by the service provider. For example, access rights associated with a PPV event may be modified such that the customer may view the PPV event utilizing any number of client devices 215 associated with the customer account. As another example, a feature set associated with a VoIP telephone service or other broadband service offered by the service provider may be modified such that the customer is provided with the service. For example, a customer profile may be updated in order to reflect an upgraded customer account and/or the addition of one or more broadband services.

As desired, once access rights and/or a feature set have been modified by the CAS controller 225, the CAS controller 225 may communicate information associated with the modification to one or more client devices 215 (e.g., set-top boxes) and/or to any number of CAS encryption devices 230. In this regard, the customer may be permitted to utilize the one or more client devices 215 to access purchased broadband content and/or services. For example, a decryption code or access code that may be utilized to decrypt a received portion of a broadband signal (e.g., a portion associated with a purchased PPV event) may be communicated to one or more client devices 215. The decryption code or access code may be utilized to decrypt the purchased content that is included in a broadband signal that is output by the CAS encryption devices 230.

With continued reference to FIG. 2, any number of CAS encryption devices 230 may be utilized as desired in various embodiments of the invention. The CAS encryption devices 230 may be suitable systems, devices, and/or software modules that are configured to encrypt or encode a broadband signal and/or portions of a broadband signal that are output by a service provider for receipt by one or more client devices 215. A wide variety of suitable encryption techniques may be utilized as desired in various embodiments of the invention. In operation, a broadband signal may be processed by the CAS encryption devices 230 prior to output and/or transmission to the client devices 215. Client devices 215 may receive and process the output signal. Based upon access rights and/or feature sets associated with a client device 215, only certain portions of a broadband signal may be processed for presentation to a customer. In certain embodiments, a client device 215 may receive an entire broadband signal and utilize various access codes and/or access rights to process the broadband signal. In other embodiments, an intervening device, such as a broadband modem situated at a cable tap or otherwise associated with the customer may selectively output portions of a broadband signal to a client device 215. In this regard, the service provider may control the broadband content and/or services that may be accessed by a customer.

In certain embodiments of the invention, one or more EBIF streamer and multiplexer systems and/or devices 245 (referred to as EBIF streamer system 245) may be provided. An EBIF streamer system 245 may be configured to incorporate EBIF applications, such as applications associated with an EPG, into a broadband signal that is output by the CAS encryption devices 230. For example, the EBIF streamer system 245 may receive information from the guide server 220 associated with EBIF applications that have been associated with EPG data. The EBIF streamer system 245 may utilize at least a portion of the received data to construct or create one or more EBIF applications. In certain embodiments, one or more templates may be utilized to construct EBIF applications. For example, a PPV purchase application template may be utilized to construct a PPV purchase application that is associated with a PPV event that is included in EPG data. Once an EBIF application has been constructed, the EBIF streamer system 245 may incorporate or direct the incorporation of the EBIF application into the broadband signal that is output by the CAS encryption devices 230. For example, the EBIF streamer system 245 may incorporate the EBIF application into an audio and video stream that is output by the CAS encryption devices 230. Although an EBIF streamer system 245 has been described, similar systems may be utilized as desired to create or generate other types of applications, such as Java applications, etc.

Communications between various components of the system 200 may be facilitated via any number of suitable networks, such as a cable network, a satellite network, and/or other networks 240 that facilitate communications between the application server 205 and/or client devices 235. The networks 240 may include any telecommunication and/or data networks, whether public, private, or a combination thereof, including but not limited to, a local area network, a wide area network, an intranet, the Internet, public switched telephone networks, satellite networks, cable networks, and/or any combination thereof and may be wired and/or wireless.

Those of ordinary skill in the art will appreciate that the system 200 shown in and described with respect to FIG. 2 is provided by way of example only. Numerous other operating environments, system architectures, and device configurations are possible. Other system embodiments can include fewer or greater numbers of components and may incorporate some or all of the functionality described with respect to the system components shown in FIG. 2.

Figure 3:
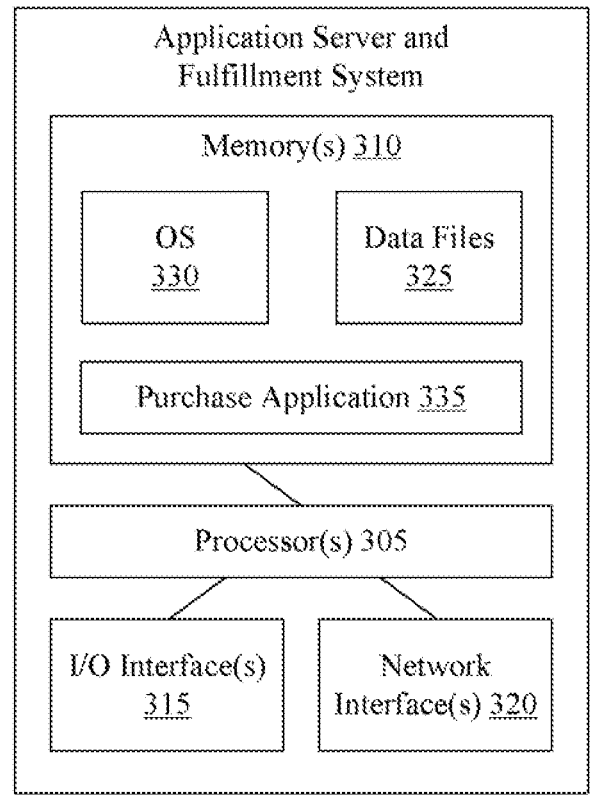
FIG. 3 illustrates a block diagram of the example components of an application server and fulfillment system, according to an illustrative embodiment of the invention.

FIG. 3 illustrates a block diagram of the example components of an application server and fulfillment system 300, such as the application server 205 illustrated in FIG. 2. It will be appreciated that other components of the system 200 may include components similar to those illustrated in FIG. 3 for the application server 205. Additionally, as desired, any number of the components illustrated in FIG. 2, such as the application server 205, billing and provisioning system 210, the guide server 220, and/or the CAS controller 225 may be incorporated into a single processor-driven device or system.

With reference to FIG. 3, the application server 300 may include one or more processors 305, one or more memory devices 310, one or more input/output ("I/O") interfaces 315, and/or one or more network interfaces 320. The processor(s) 305 may be configured to execute any number of software applications and/or computer-readable or computer-executable instructions. The memory devices 310 may include any number of suitable memory devices, such as caches, read-only memory devices, random access memory devices, magnetic storage devices, etc. The memory devices 310 may store data, executable instructions, and/or various program modules utilized by the processor(s) 305. Examples of data that may be stored by the memory devices 310 include data files 325 and/or any number of suitable program modules that may be executed by the processor(s), such as an operating system ("OS") 330 and/or a purchase application 335. The data files 325 may include any suitable data that facilitates the operation of the application server 300, the receipt of purchase requests, and/or the processing of purchase requests. For example, the data files 325 may include, but are not limited to, information that facilitates communication with any number of client devices (e.g., set-top boxes, mobile devices, Web-enabled devices, etc.), information that facilitates communication with a billing and provisioning system and/or a CAS controller, customer account information, client device information, and/or information that facilitates the presentation of various offers to customers.

The OS 330 may be a suitable software module that controls the general operation of the application server 300. The OS 330 may also facilitate the execution of other software modules, for example, the purchase application 335. As desired, the application server 300 may additionally include one or more host modules that facilitate the establishment of a communications session with one or more client devices, such as the client devices 215, 235 illustrated in FIG. 2. In this regard, the application server 300 may receive one or more purchase requests for broadband content, broadband services, and/or other goods or services. For example, a host module may be configured to establish a communications session with a Web-enabled client device and provide any number of Web pages to the client device, such as Web pages that provide information associated with broadband content, broadband services and/or other products and services that are available for purchase.

The purchase application 335 may be a suitable software module or software application that is configured to receive and process purchase requests. In operation, the purchase application 335 may receive a purchase request from a client device or customer device, such as a set-top box, a mobile device, a Web-enabled device, or other client device. The request may be received using any number of suitable networks, such as a cable network, a satellite network, the Internet, a wide area network, a Wi-Fi network, etc. In certain embodiments, a purchase request may be received via one or more Web pages and/or other graphical user interfaces that are hosted by the application server 300.

Once a purchase request has been received, the purchase application 335 may direct the completion of a transaction associated with the purchase request. According to an aspect of the invention, the transaction may be completed in real-time or near real-time once the purchase request is received. For example, the purchase application 335 may direct a billing and provisioning system to complete a real-time transaction associated with a received purchase request. Following the successful completion of a transaction, the purchase application 335 and/or one or more other applications associated with and/or in communication with the application server 300 may direct the provision of purchased content, products, and/or services to a customer. According to an aspect of the invention, a customer may utilize any number of client devices, such as any number of client devices associated with a customer account (e.g., one or more set-top boxes, one or more mobile devices, one or more Web-enabled devices, etc.) to access or utilize purchased broadband content and/or broadband services. In this regard, the purchase application 335 and the application server 300 may provide a cross-platform real-time purchasing system for use by one or more customers. One example of the operations that may be performed by the purchase application 335 is described in greater detail below with reference to FIG. 4.

The one or more I/O interfaces 315 may facilitate communication between the application server 300 and one or more input/output devices, for example, one or more user interface devices, such as a display, keypad, mouse, pointing device, control panel, touch screen display, remote control, microphone, speaker, etc., that facilitate user interaction with the application server 300. In this regard, user commands may be received by the application server 300.

The one or more network interfaces 320 may facilitate connection of the application, server 300 to one or more suitable networks, for example, a broadband network (e.g., a cable network, satellite network, etc.) and/or the networks 240 illustrated in FIG. 2. In this regard, the application server 300 may receive and/or communicate information to other components of the system 200 illustrated in FIG. 2, such as one or more client devices 215, 235. As desired, the network interfaces 320 may include one or more broadband signal interfaces configured to connect to a broadband network, such as a cable network, satellite network, etc. Additionally, the network interfaces 320 may include one or more other interfaces that are configured to connect to a wide area network, cellular network, telecommunications network, the Internet, and/or other types of networks.

Figure 4:
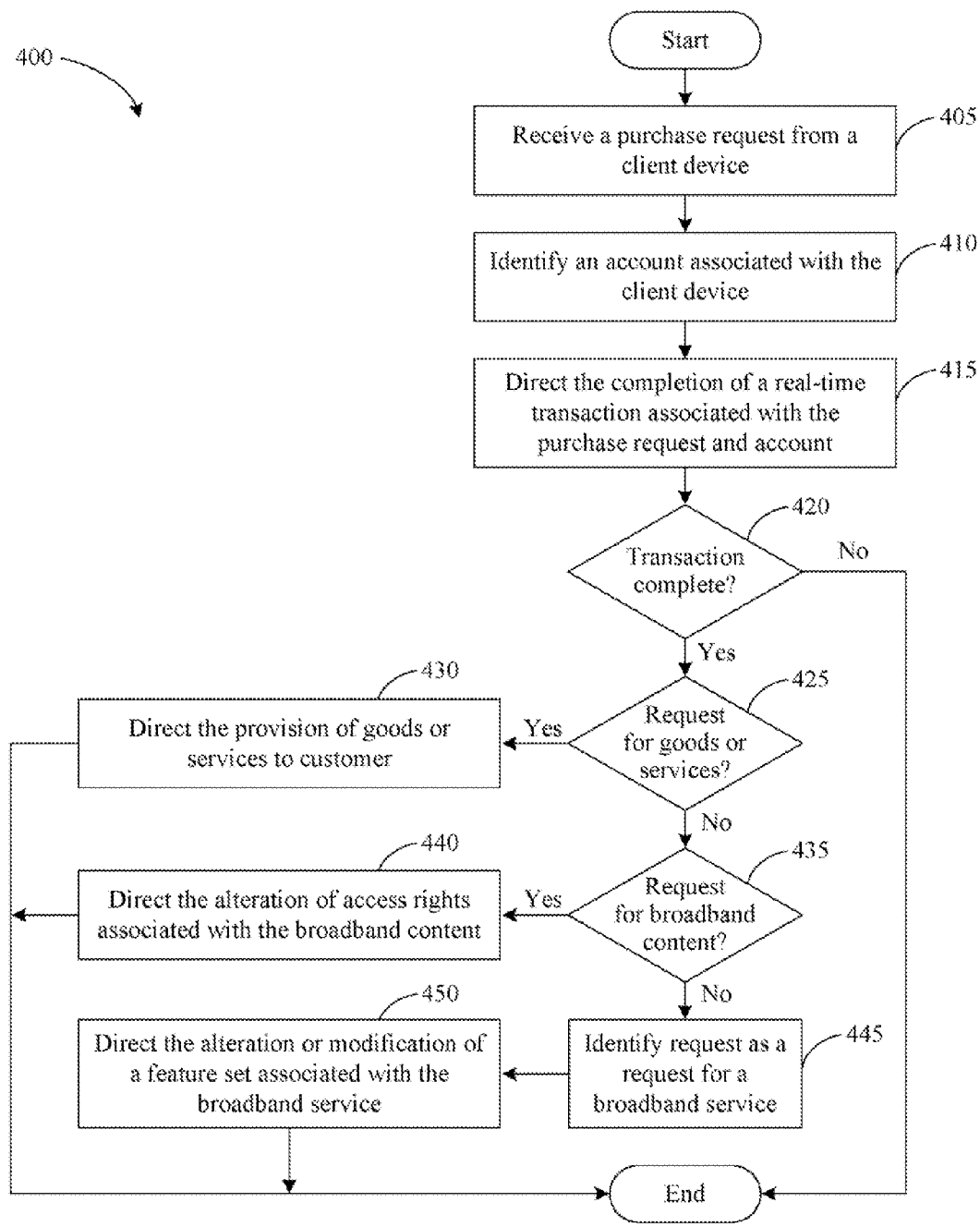
FIG. 4 is a flow diagram of an example method for processing a purchase request received from a customer device, according to an example embodiment of the invention.

Those of ordinary skill in the art will appreciate that the components of the application server 300 shown in and described with respect to FIG. 3 are provided by way of example only. Numerous other components and/or combinations of components may be utilized as desired for the application server 300 in various embodiments of the invention, Operational Overview FIG. 4 is a flow diagram of an example method 400 for processing a purchase request received from a customer device, according to an example embodiment of the invention. The method 400 may be performed by a suitable application server and/or other components of a service provider system, such as the application server 205 illustrated in FIG. 2 or the application server 300 illustrated in FIG. 3. The method 400 may begin at block 405.

At block 405, a purchase request may be received from a client device or customer device. As desired, a wide variety of communications techniques and/or networks may be utilized to facilitate the receipt of a purchase request. For example, a purchase request may be received from a STB via an upstream communication over a Cable network or satellite network. As another example, a purchase request may be received via a wide area network (e.g., the Internet) based upon the access of one or more Web pages and/or Universal Resource Locators ("URLs") that are hosted by the application server 205. Additionally, a received purchase request may be associated with a wide variety of goods and/or services, such as desired broadband content, one or more desired broadband services, physical goods or products, and/or services that are offered or provided by third-party service providers. As desired in various embodiments of the invention, a wide variety of information may be included in and/or received in association with a service request, including but not limited to, one or more identifiers associated with desired content, products, and/or services (e.g., a unique identifier associated with a PPV event, an identifier associated with a programming package, an identifier associated with an upgraded or additional broadband service, a Universal Product Code associated with one or more desired products, etc.), one or more identifiers associated with a client device (e.g., a unique device identifier, an Internet Protocol address, etc.), identifying information associated with a customer (e.g., a customer account number, a customer name, a customer address, etc.), and/or pricing information associated with desired content, products, and/or services.

At block 410, which may be optional in certain embodiments of the invention, an account associated with the client device and/or the customer may be identified. For example, a customer billing account with the service provider may be identified based upon an identifier of a client device and/or other information included in the purchase request. In this regard, a customer billing account may be charged for content, products, and/or services that are purchased.

At block 415, the completion of a transaction associated with the purchase request and an identified account (e.g., a customer billing account) may be directed. For example, a billing and provisioning system, such as the billing and provisioning system 210 illustrated in FIG. 2, may be directed to complete a transaction. According to an aspect of the invention, the transaction may be completed in real-time or near real-time, thereby reducing and/or eliminating lost revenue stemming from stale purchases. In certain embodiments, a transaction may be completed by billing a customer account for an amount associated with the purchase request, such as a purchase amount for various content, products, and/or services that are purchased. As desired, a service provider transaction fee or service fee may be added to a purchase amount.

At block 420, a determination may be made as to whether the transaction has been successfully completed and/or whether the transaction has been approved. If it is determined at block 420 that the transaction has not been successfully completed, then the method 400 may end. If however, it is determined at block 420 that the transaction has been successfully completed or approved, then operations may continue at block 425.

At block 425, a determination may be made as to whether the purchase request is a request for goods and/or services, such as physical goods offered by a merchant and/or services provided by one or more third-party service providers. For example, information included in the purchase request (e.g., product identifiers, etc.) may be analyzed in order to determine whether the purchase request is a request for goods or services. If it is determined at block 425 that the purchase request is a request for goods or services, then operations may continue at block 430. At block 430, the provision and/or delivery of the goods and/or services to the customer may be directed. For example, a distributor and/or manufacturer may be directed to ship or deliver purchased goods to a stored customer mailing address or an address that is designated by the purchase request. As another example, a service provider may be directed to contact the customer to schedule the provision of a purchased service to the customer. Operations may then end following block 430.

If, however, it is determined at block 425 that the purchase request is not a request for goods or services, then operations may continue at block 435. At block 435, a determination may be made as to whether the purchase request is a request for broadband content (e.g., a PPV event, other video content, audio content, etc.). If it is determined at block 435 that the purchase request is a purchase request for broadband content, then operations may continue at block 440. At block 440, the alteration or modification of access rights associated with the purchased broadband content may be directed. For example, a CAS controller, such as the CAS controller 225 illustrated in FIG. 2, may be directed to modify access rights associated with the broadband content and/or to communicate access credentials and/or access codes to one or more client devices associated with the customer. As a result of modifying access rights associated with broadband content, a customer may be permitted to utilize any number of client devices (e.g., multiple set-top boxes, Web-enabled devices, mobile devices, etc.) to access and/or utilize the purchased broadband content in accordance with the modified access rights. For example, the customer may be permitted to utilize any number of set-top boxes associated with a customer account to view a purchased PPV event. In certain embodiments, a customer may utilize a first customer device to purchase broadband content, and the customer may utilize a second customer device to access the purchased content. As a result of completing a transaction in real-time and modifying access rights for broadband content in association with a customer account, a cross-platform system for purchasing broadband content may be provided. The cross-platform system may facilitate access of the broadband content from any number of client devices. Operations may end following block 440.

If however, it is determined at block 435 that the purchase request is not a request for broadband content, then operations may continue at block 445. At block 445, the purchase request may be identified as a purchase request for one or more broadband services. As desired, the broadband service(s) associated with the purchase request may be identified. Operations may then continue at block 450. At block 450, the alteration or modification of a feature set associated with a customer account and/or the purchased broadband service may be directed. For example, a customer profile that establishes the broadband services that are provided in association with a customer account may be updated to reflect a purchase of one or more additional broadband services. One or more service provider head end devices (e.g., a CAS controller, etc.) and/or intermediary devices situated between a service provider head end and a client device (e.g., a service provider gateway device, etc.) may then be directed to provide the additional broadband service(s) to the customer. For example, a feature set associated with a VoIP telephone broadband service may be modified such that the service is provided to a customer. The VoIP service may then be provided to the customer via one or more set-top boxes and/or other devices associated with the customer. As desired, the service provider may schedule a time or time window for a technician to install additional hardware associated with a purchased broadband service (e.g., a VoIP-enabled telephone, etc.) at a customer location. Operations may end following block 450.

The method 400 may end following either block 420, 430, 440, or 450.

The operations described and shown in the method 400 of FIG. 4 may be carried out or performed in any suitable order as desired in various embodiments of the invention. Additionally, in certain embodiments, at least a portion of the operations may be carried out in parallel. Furthermore, in certain embodiments, less than or more than the operations described in FIG. 4 may be performed.

Various block and/or flow diagrams of systems, methods, apparatus, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method, comprising:
    receiving, by a server associated with a service provider comprising one or more computers from a customer device associated with a customer, a purchase request to purchase broadband content or a broadband service;
    determining whether the purchase request is to purchase the broadband content or the broadband service;
    directing, by the server in real-time, the completion of a transaction associated with the received purchase request;
    altering, by the server if the purchase request is to purchase the broadband content, access rights associated with the broadband content, wherein altering access rights includes notifying a conditional access system ("CAS") controller to modify the access rights and notifying the CAS controller to communicate access credentials or access codes to the customer device and a second customer device;
    altering, by the server if the purchase request is to purchase the broadband service, a feature set associated with the broadband service;
    enabling, by the server based at least in part on the completion of the transaction, customer access to the broadband content or the broadband service;
    determining, by the server, that the second customer device associated with the customer is capable of accessing the broadband content or the broadband service;
    enabling, by the server based at least in part on completion of the transaction, customer access to the broadband content or the broad-band service via the second customer device; and
    transmitting, by the server to the second customer device, an indication that the broadband content or broadband service is to be made available to the second customer device from the service provider, wherein the indication allows the second customer device to receive, from the server, the broadband content or the broadband service purchased by the first computing device.

2. The method of claim 1, wherein the second customer device comprises at least one of (i) the customer device from which the request was received or (ii) another device.

3. The method of claim 1, wherein receiving the purchase request from a customer device comprises receiving the purchase request from one of (i) a set-top box, (ii) a mobile device, or (iii) a Web-enabled device.

4. The method of claim 1, wherein receiving the purchase request from a customer device comprises receiving the purchase request via a purchase application executing on the customer device.

5. The method of claim 1, further comprising:
    identifying, by the server, an account associated with the customer device,
    wherein enabling customer access comprises enabling access to the broadband content or the broadband service via one or more devices associated with the account.

6. The method of claim 1, further comprising:
    identifying, by the server, one or more devices that may be utilized by the customer to access the broadband content or the broadband service,
    wherein enabling customer access comprises enabling access to the broadband content or the broadband service via the one or more identified devices.

7. The method of claim 1, wherein the purchase request comprises a first purchase request, the transaction comprises a first transaction, and further comprising:
    receiving, by the server from the customer device, a second purchase request for a good or service;
    directing, by the server in real-time, the completion of a second transaction associated with the received second purchase request; and
    directing, by the server, the provision of the good or service to the customer.

8. The method of claim 1, wherein enabling customer access includes enabling the customer to utilize the customer device or the second customer device to access the broadband content or the broadband service.

9. A system comprising:
    at least one communications interface configured to receive, from a customer device associated with a customer, a purchase request to purchase broadband content or a broadband service; and
    at least one processor configured to:
        determine whether the purchase request is to purchase the broadband content or the broadband service;
        direct, in real-time, the completion of a transaction associated with the received purchase request;
        alter, if the purchase request is to purchase the broadband content, access rights associated with the broadband content, wherein altering access rights includes notifying a conditional access system ("CAS") controller to modify the access rights and notifying the CAS controller to communicate access credentials or access codes to the customer device and a second customer device;
        alter, if the purchase request is to purchase the broadband service a feature set associated with the broadband service;
        enable, based at least in part on the completion of the transaction, customer access to the broadband content or the broadband service;
        determine that the second customer device associated with the customer is capable of accessing the broadband content or the broadband service;
        enable, based at least in part on completion of the transaction, customer access to the broadband content or the broad band service via the second customer device; and transmit an indication that the broadband content or broadband service is to be made available to the second computing device from the service provider, wherein the indication allows the second customer device to receive the broadband content or the broadband service purchased by the first computing device.

10. The system of claim 9, wherein the second customer device comprises at least one of (i) the customer device from which the request was received or (ii) another device.

11. The system of claim 9, wherein the customer device comprises one of (i) a set-top box, (ii) a mobile device, or (iii) a Web-enabled device.

12. The system of claim 9, wherein the purchase request is received via a purchase application executing on the customer device.

13. The system of claim 9, wherein the at least one processor is further configured to:
identify an account associated with the customer device; and
enable customer access by enabling access to the broadband content or the broadband service via one or more devices associated with the account.

14. The system of claim 9, wherein the at least one processor is further configured to:
identify one or more devices that may be utilized by the customer to access the requested broadband content or the broadband service; and
enable customer access by enabling access to the broadband content or the broadband service via the one or more identified devices.

15. The system of claim 9, wherein:
the purchase request comprises a first purchase request, the transaction comprises a first transaction, and
the at least one processor is further configured to (i) receive, from the customer device, a second purchase request for a good or service, (ii) direct, in real-time, the completion of a second transaction associated with the received second purchase request, and (iii) direct the provision of the good or service to the customer.

16. A method, comprising:
receiving, by an application server comprising one or more computers from a customer device associated with a customer, a purchase request to purchase broadband content or a broadband service;
determining whether the purchase request is to purchase the broadband content or the broadband service;
identifying, by the application server, an account associated with the customer;
directing, by the application server based upon the identified account, the completion of a real-time transaction associated with the received purchase request;
altering, by the application server if the purchase request is to purchase the broadband content, access rights associated with the broadband content, wherein altering access rights includes notifying a conditional access system ("CAS") controller to modify the access rights and notifying the CAS controller to communicate access credentials or access codes to the customer device and a second customer device;
altering, by the application server if the purchase request is to purchase the broadband service, a feature set associated with the broadband service;
enabling, by the application server based at least in part on the completion of the transaction, customer access to the broadband content or the broadband service;
determining that the second customer device associated with the customer is capable of accessing the broadband content or the broadband service;
enabling, by the application server based at least in part on completion of the transaction, customer access to the broadband content or the broad-band service via the second customer device; and
transmitting an indication that the broadband content or the broadband service to be made available to the second customer computing device from the service provider, wherein the indication allows the second customer device to receive, from the server, the broadband content or the broadband service purchased by the first computing device.

17. The method of claim 16, wherein the plurality of devices comprise at least one of (i) the customer device from which the request was received or (ii) another device.

18. The method of claim 16, wherein receiving the purchase request from a customer device comprises receiving the purchase request from one of (i) a set-top box, (ii) a mobile device, or (iii) a Web-enabled device.

* * * * *